United States Patent

Mecredy, III et al.

[11] Patent Number: 6,118,655
[45] Date of Patent: Sep. 12, 2000

[54] COOLING FAN WITH HEAT PIPE-DEFINED FAN HOUSING PORTION

[75] Inventors: Henry E. Mecredy, III, Houston; Egons K. Dunens, Spring, both of Tex.

[73] Assignee: Compaq Computer Corporation, Houston, Tex.

[21] Appl. No.: 08/986,598

[22] Filed: Dec. 8, 1997

[51] Int. Cl.[7] .................................. G06F 1/20; H05K 7/20
[52] U.S. Cl. ......................... 361/687; 361/700; 361/697; 361/695; 165/80.3; 165/80.4; 165/104.33; 165/185; 62/259.2; 174/15.2
[58] Field of Search .................................. 361/687, 699, 361/700, 695, 697; 165/80.3, 80.4, 104.33, 122–126; 62/259.2; 174/15.2, 16.3

[56] References Cited

U.S. PATENT DOCUMENTS

| | | | |
|---|---|---|---|
| 2,469,259 | 5/1949 | Burgess | 165/122 |
| 3,196,939 | 7/1965 | Erbe et al. | 165/122 |
| 3,417,227 | 12/1968 | Barbier et al. | 165/122 |
| 4,600,050 | 7/1986 | Noren | 165/104.33 |
| 4,706,739 | 11/1987 | Noren | 165/104.33 |
| 5,383,340 | 1/1995 | Larson et al. | 62/259.2 |
| 5,583,316 | 12/1996 | Kitahara et al. | 174/16.3 |
| 5,694,295 | 12/1997 | Mochizuki et al. | 361/699 |
| 5,712,762 | 1/1998 | Webb | 361/687 |
| 5,910,883 | 6/1999 | Cipolla et al. | 361/687 |

*Primary Examiner*—Leo P. Picard
*Assistant Examiner*—Lisa Lea-Edmonds
*Attorney, Agent, or Firm*—Konneker & Smith, P.C.

[57] ABSTRACT

Heat generating components in the base housing of a portable computer are thermally communicated with a longitudinal evaporator portion of a thermosyphoning heat pipe. A longitudinal condenser portion of the heat pipe is flattened, bent to a circular shape, and secured in thermal communication to the periphery of a metal housing base plate of an axial fan to form the shroud portion of the fan housing. With its axis vertically disposed, the fan is placed in a plenum area within the base housing beneath a cooling air inlet depression in the top base housing side which permits ambient air to flow into the fan even when the display housing portion of the computer is closed. Component operating heat is sequentially transferred into the heat pipe evaporating portion, along the heat pipe into its shroud-defining condenser portion and the metal housing base plate, into the air being flowed through the fan and along surfaces of the shroud and base plate, and is then discharged with the outlet air flowing through the plenum and outwardly through exterior wall openings in the base housing. Alternate centrifugal embodiments of the fan have housing air inlet and outlet air flow passage portions, and a scroll housing section, formed by a longitudinal condenser portion of a thermosyphoning heat pipe.

32 Claims, 2 Drawing Sheets

COOLING FAN WITH HEAT PIPE-DEFINED FAN HOUSING PORTION

BACKGROUND OF THE INVENTION

1. Field of the Invention

The present invention generally relates to the dissipation of operating heat in electronic devices such as computers and, in a preferred embodiment thereof, more particularly provides a computer in which component operating heat is conducted to an evaporator portion of a heat pipe having a condenser portion forming the shroud section of an axial heat dissipation fan.

2. Description of Related Art

Portable computers, such as the ever popular compact notebook computer, present unique component-cooling problems. For example, as notebook computers become more powerful and sophisticated their small base housings are being more densely packed with faster and considerably hotter operating components such as processors, drives, AC/DC converters, modems and the like. The prime portable computer requirement for compactness is thus becoming a greater and greater barrier to meeting the critical requirement to effectively dissipate component operating heat generated in the base housing. Heat must be moved away from these internal components to keep their maximum temperatures low enough to prevent thermal overload failures thereof.

Without forced ventilation, this internal operating heat must be dissipated at the computer's external surfaces. Of course, more operating heat can be dissipated to ambient by increasing the exterior surface area or permitting the exterior computer surface area to reach a higher temperature during operation of the computer. However, the exterior surface area available for heat transfer is limited by the computer's size (which must be kept compact), and the allowable maximum exterior surface temperature of the computer is limited by the comfort of the user, who is likely to be in close physical contact with the computer while it is operating. Spreading of the heat to the various external surfaces, by conduction or by using thermosyphoning heat pipes, is helpful in this regard but presents difficult technical challenges.

Forced ventilation using fans is commonly employed for all manner of larger electronic products including computers of desktop and larger sizes (i.e., considerably larger in internal volume than portable computers). These products lend themselves well to such cooling because physical room is available both for internal cooling passages and for the mounting of adequate capacity fans. Fan ventilation has also been used for portable computers, but generally with poor efficiency owing to the major compromises with respect to available internal cooling air paths. Compactness dictates that internal components and circuit boards be packed as tightly as possible, a situation that unavoidably reduces the size and number of interior passages through which cooling air can be routed.

In order to overcome the various portable computer cooling problems outlined above, various cooling systems have been previously proposed in which thermosyphoning heat pipes are used in combination with fans. These methods are not unique to small computers, but have been adapted to them from other cooling applications.

One previously proposed approach to using a heat pipe in a forced air cooling application in a portable computer has been to mount a cooling fan in a side wall of the computer housing so as to discharge air outwardly therethrough, and place a condenser end portion of a heat pipe, with cooling fins thereon, outwardly adjacent the inlet to the fan. An evaporator portion of the heat pipe was placed in thermal communication with a heat generating component within the computer housing.

The main disadvantages of this previously proposed approach are the relative remoteness of the heat pipe condenser portion from the fan, the relative inefficiency of the fins, and the space inefficiency of having to dedicate housing volume to both the fan and the associated separate cooling fin structure.

From the standpoint of the heat pipe condenser portion being remote from the fan, the air flow through the fins is primarily laminar. This feature is designed into the system to promote fan and air flow efficiency, but results in a penalty in efficiency as to the overall heat transfer efficiency of the cooling system. The thermal inefficiency of the fins themselves arise from the fact that, in general, the portions of the fins most distant from the heat pipe condenser portion are relatively cool and are thus less effective in transferring heat to the moving cooling air. These fin portions accordingly obstruct cooling air flow but provide relatively low heat transfer thereto.

From the foregoing it can be seen that a need thus exists for an improved heat pipe-based forced air cooling system for a portable computer. It is to this need that the present invention is addressed.

SUMMARY OF THE INVENTION

In carrying out principles of the present invention, in accordance with a preferred embodiment thereof, a specially designed heat dissipating fan apparatus is provided which is representatively incorporated in the base housing of a portable computer. The heat dissipating fan apparatus comprises a housing has a flow passage therein, a rotatable structure carried by the housing and being operable to force air through the flow passage, and a heat pipe.

The heat pipe is of a generally conventional thermosyphoning type and has an evaporator portion positionable in thermal communication with a heat-generating object to receive heat therefrom, and a condenser portion to which the received heat is automatically transferred and from which the received heat may be dissipated.

According to a key aspect of the present invention the condenser portion of the heat pipe is used to define a portion of the fan housing that is exposed to air being forced through the flow passage of the fan housing. Representatively, the fan is an axial fan and the heat pipe condenser portion is used to define a housing shroud portion of the fan. Preferably, the cross-section of the condenser portion of the heat pipe is elongated in the direction of the air flow through the shroud.

The cross-sectional shape of the condenser section is illustratively of an elongated rectangular configuration, and the heat pipe-defined shroud is connected in a heat transfer relationship with a metal housing base plate having air outlet openings formed therein. The air outlet openings representatively have air straightening tabs projecting outwardly therefrom.

In a preferred embodiment of the present invention the axial fan, with its heat pipe-defined shroud portion, is supported in a base housing of a portable computer, and the evaporator portion of the heat pipe is placed in thermal communication with one or more heat-generating components in the base housing.

During operation of the computer, component operating heat is transferred from the heat pipe evaporator portion to its condenser portion and the fan housing base plate. Heat from the shroud and base plate is dissipated to the fan-driven cooling air coming in contact with the shroud and base plate and then is transferred to ambient, being carried out of the base housing with the discharged fan air. The turbulence imparted to the cooling air as it traverses inner side surface portions of the shroud and the fan housing base plate substantially enhances the heat transfer from the shroud and base plate to the air. The efficiency of this heat transfer is further enhanced by the preferably elongated cross-sectional shape of the heat pipe-defined shroud.

According to other aspects of the invention, the rotational axis of the axial cooling fan is vertically oriented within the computer base housing to minimize the housing height requirement for the fan, and the fan is mounted within an internal plenum positioned below a depressed top side edge portion of the base housing which forms an air inlet pocket that opens to the exterior of the computer even with its lid or display housing closed. During operation of the vertically oriented axial fan, ambient cooling air is drawn through the pocket area and into the fan through inlet openings in a bottom side wall portion of the pocket area. After being swept along the heat pipe-defined shroud and the fan housing base plate the air, to which substantial component operating heat has now been transferred, is discharged through the internal housing plenum chamber and horizontally out exterior wall section outlet openings spaced apart from the pocket area inlet openings.

Compared to the use of cooling fins mounted on the heat pipe condenser and placed directly at the fan inlet or outlet, the incorporation of the heat pipe condenser section into the axial cooling fan as its shroud portion improves the heat transfer efficiency of the heat pipe, and substantially reduces the cooling system space required in the computer base housing. Additionally, the elimination of cooling fins at the fan inlet tends to improve the aerodynamic efficiency of the fan.

The present invention's incorporation of a heat pipe condenser portion into a fan as an integral portion of the fan along which fan-driven cooling air flows is not limited to the shroud portion of an axial fan. In other embodiments of the present invention a centrifugal fan is used, with the condenser portion of the heat pipe representatively forming a portion of an air inlet or outlet passage of the centrifugal fan housing, or at least a portion of the scroll section thereof.

DETAILED DESCRIPTION

Figure 1:
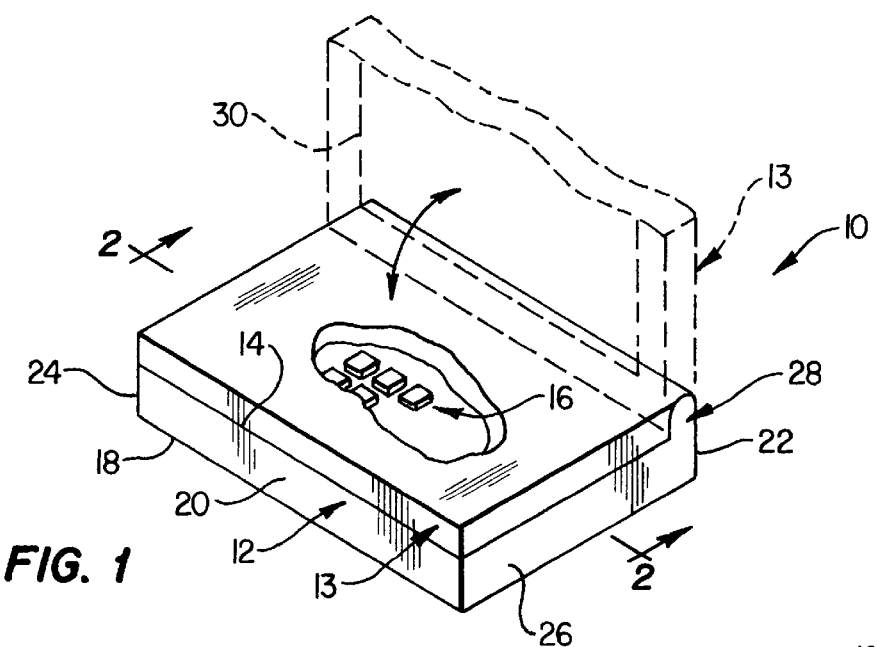
FIG. 1 is a simplified, partially cut away perspective view of a representative portable notebook computer incorporating therein specially designed heat dissipation apparatus embodying principles of the present invention.

Perspectively illustrated in FIG. 1 in simplified form is an electronic device, representatively a portable notebook computer 10 having incorporated therein specially designed heat dissipation apparatus embodying principles of the present invention. The computer 10 includes rectangular base and lid housings 12 and 13. Base housing 12 has a top side 14 on which a keyboard 16 is operatively mounted, a bottom side 18, front and rear sides 20 and 22, and left and right ends 24 and 26.

Lid housing 13 has a somewhat thinner rectangular configuration and is secured by a hinge structure 28 to a rear edge portion of the base housing 12 for pivotal movement relative thereto between the indicated solid line position in which the lid housing 13 extends across and covers the top side 14 of the base housing 12, and an upwardly pivoted dotted line use position in which a display screen 30 carried by the lid housing faces the user of the computer 10. Suitable latch means (not shown) are provided for releasably holding the lid housing 13 in its closed position.

Figure 2:
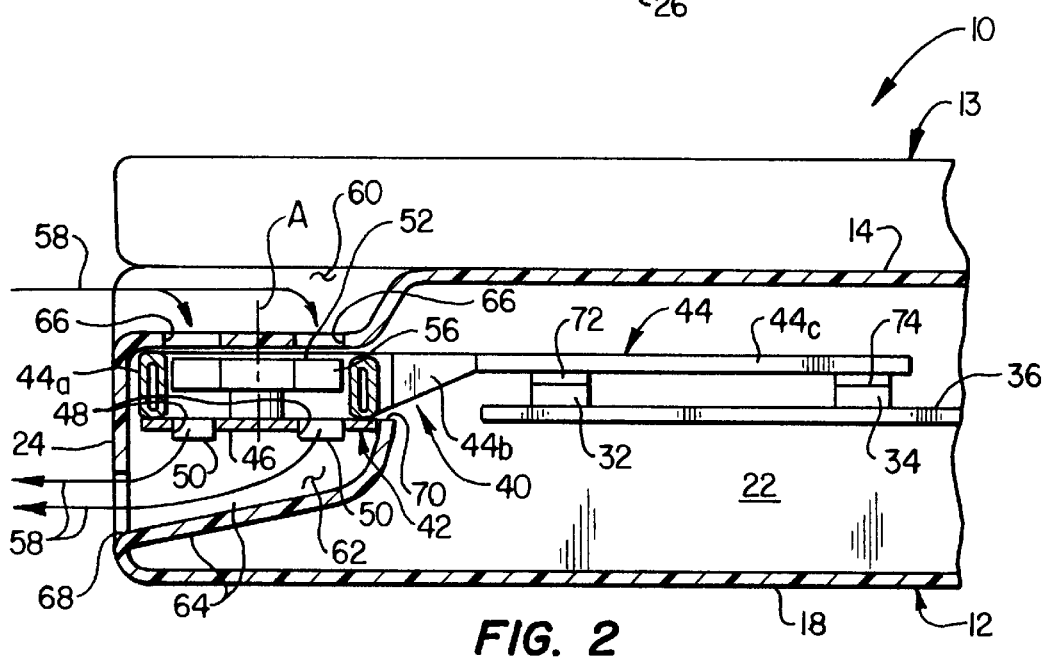
FIG. 2 is an enlarged scale simplified partial cross-sectional view through the computer taken along lined 2—2 of FIG. 1.

Turning now to FIG. 2, in addition to other electronic apparatus operatively disposed within the interior of the base housing 12 are various heat-generating components such as the two representative heat-generating components 32 and 34 mounted on the top side of a horizontally oriented printed circuit board 36 suitably supported within the base housing 12.

In accordance with a primary aspect of the present invention, operating heat from the components 32 and 34 is efficiently dissipated to the exterior of the computer 10 by specially designed compact heat dissipation apparatus 40 of the present invention. In the preferred embodiment thereof depicted in FIGS. 2—4, the heat dissipation apparatus 40 comprises two primary components—(1) an axial flow cooling fan 42, and (2) a thermosyphoning heat pipe 44.

Figure 4:
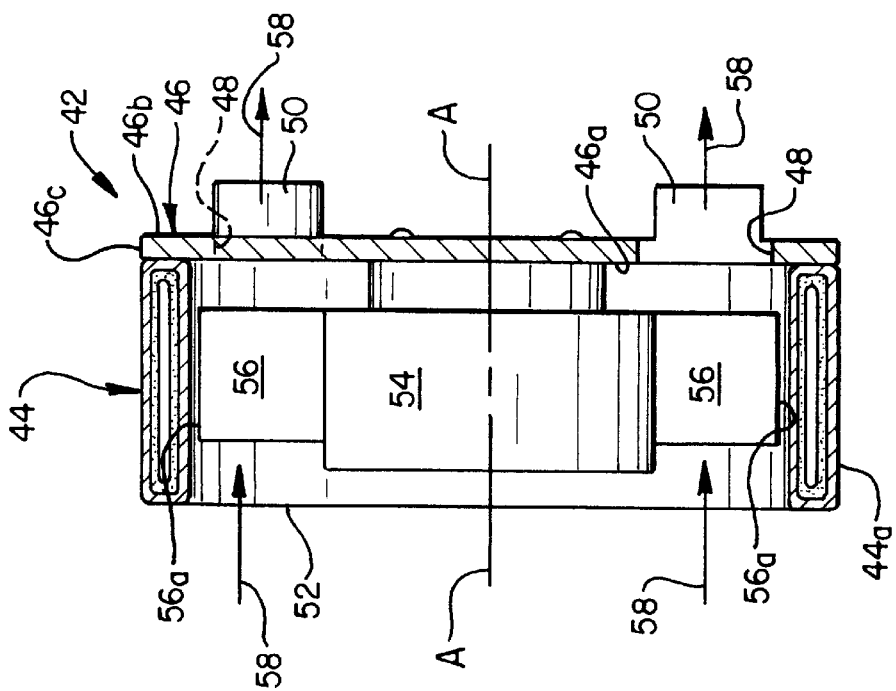
FIG. 4 is a simplified cross-sectional view through the cooling fan taken along line 4—4 of FIG. 3.
Figure 3:
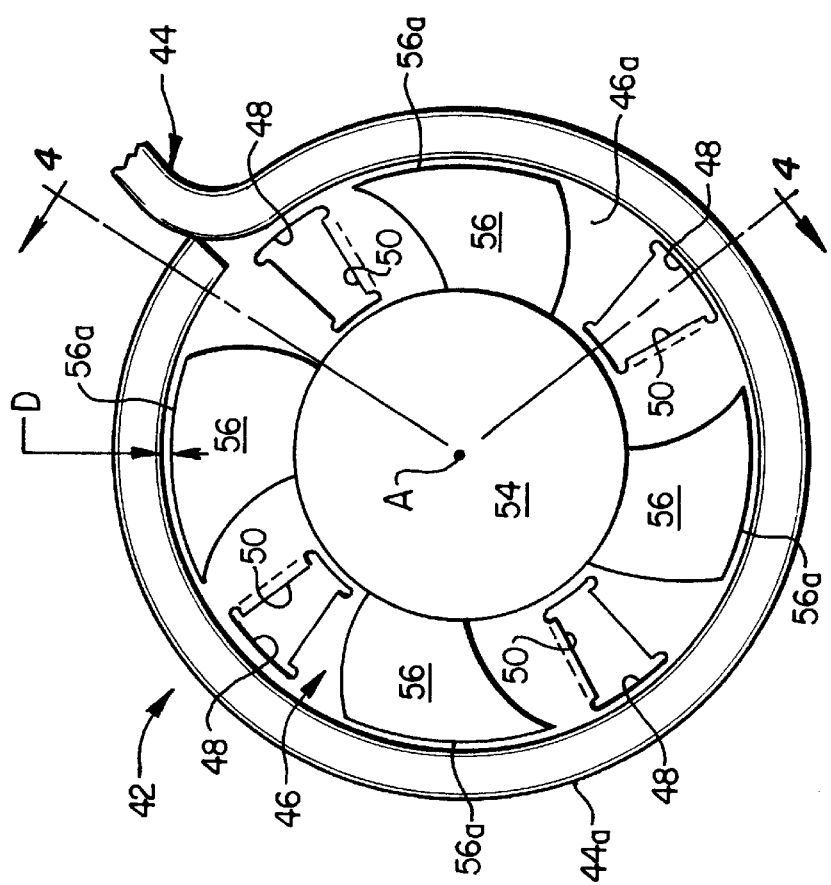
FIG. 3 is an enlarged scale top plan view of a cooling fan portion of the heat dissipation apparatus shown in FIG. 2.

The axial cooling fan 42, as best illustrated in FIGS. 3 and 4, has a generally disc-shaped circular housing base plate portion 46 with inner and outer sides 46a and 46b. Base portion 46 is centered about the rotational fan axis A and is formed from a heat conductive material, representatively copper, and has a circumferentially spaced plurality of air outlet openings 48 formed therein and inset somewhat from its peripheral edge 46c. Each outlet opening 48 is preferably stamped lance fashion in the base portion 46 in a manner forming at each opening 48 an outwardly projecting tab 50 that functions as a discharge air straightening vane.

The balance of the axial fan housing is defined by a flattened condenser or heat-rejecting portion 44a of the heat pipe 44 which is wrapped in a circular shape and suitably secured around a peripheral portion of the inner side 46a of the housing base plate 46 in a heat conductive relationship therewith. As best illustrated in FIG. 4, the cross-sectional shape of the condenser heat pipe portion 44a has a generally rectangular configuration which is substantially elongated in a direction parallel to the fan axis A. Installed in this manner, to form a portion of the fan housing, the heat pipe condenser portion 44a forms the shroud of the housing.

As viewed in FIG. 4, the overall axial fan housing structure 44a,46 has an open left inlet side 52. A cylindrical fan hub 54 having a circumferentially spaced plurality of fan blades 56 projecting outwardly from its periphery is centrally supported within the housing structure 44a,46, for rotation about the fan axis A, by an electric motor 58 that operatively drives the hub 54 and is itself suitably secured to the inner side 46a of the housing base plate 46. Blades 56 have outer tip surfaces 56a which are spaced inwardly a small radial clearance distance D from the inner side of the shroud-defining heat pipe condenser portion 44a as shown in FIG. 3. During operation of the axial fan 42 (see FIG. 4) air 58 is drawn in through the open side 52 of the housing structure 44a,46, passes across the rotating blades 56, and is discharged through the air outlet openings 48.

Turning now to FIG. 2, at the juncture of the base housing top side wall 14 and left end wall 24 a depression is formed to create a small air inlet pocket 60 which permits an inflow of cooling air 58 thereinto even when the lid housing 13 is closed as shown in FIG. 2. The axial cooling fan 42, with its axis A vertically oriented, is suitably supported (with the fan's housing base portion 46 facing downwardly) within an enclosed air flow plenum 62 defined within the base housing by the indicated interior wall structure 64.

Plenum 62 opens outwardly through the base housing 12 via inlet openings 66 in the base housing top side wall 14 above the plenum 62, and through air outlet openings 68 formed in the base housing end wall 24. A short portion of the rectangularly cross-sectioned heat pipe condenser portion 44a extends outwardly through an opening 70 in the plenum wall structure 64 and then transitions, as at 44b, to a circularly cross-sectioned evaporator or heat-receiving longitudinal portion 44c of the heat pipe 44. Heat pipe evaporator portion 44c, as illustrated in FIG. 2, is connected in a heat conductive relationship to metal collector plates 72,74 which are respectively mounted on the top sides of the heat-generating components 32 and 34 on the circuit board 36.

During operation of the computer 10, operating heat from the components 32,34 is sequentially transferred (1) to the collector plates 72 and 74; (2) from the collector plates 72,74 to the evaporator portion 44c of the heat pipe 44; (3) from the evaporator portion 44c to the heat pipe condenser portion 44a; and (4) from the evaporator portion 44c to the metal housing base plate 46.

As this heat transfer is occurring, ambient cooling air 58 is being sequentially drawn into the inlet pocket 60, forced downwardly through the axial fan 42 into the plenum 62, and then discharged outwardly through the air outlet openings 68 in the base housing end wall 24. As this air 58 passes downwardly through the fan housing structure 44a, 46 it flows along the inner side surface of the fan housing shroud defined by the heat pipe portion 44a, and impinges on the housing base plate 46 before being discharged through the bottom side fan outlet openings 48.

At this point, several features of the heat dissipation apparatus 40 should be noted. First, the air flow traversing the blade-tip/shroud gap D (see FIG. 3) and impinging on the housing base plate 46 is quite turbulent—a factor significantly enhancing the heat transfer from the shroud and base plate 44a,46 to the air traversing the fan 42. Additionally, as previously mentioned, the cross-section of the condenser portion 44a of the heat pipe 44 is preferably elongated in the direction of air flow through the fan 42 (i.e., elongated in a direction parallel to the axis A).

This cross-sectional elongation of the heat pipe portion 44a (which is illustratively achieved via the rectangular cross-section of the heat pipe portion 44a) substantially increases the surface area of the heat pipe portion 44a which is contacted by the air 58, compared to, for example, leaving the heat pipe evaporator portion 44a in its normal round cross-sectional configuration. However, as will be readily appreciated by those of skill in this particular art, the cross-section of the heat pipe portion 44a which defines the axial fan shroud could alternatively be left round, or elongated in a manner other than providing it with a rectangular cross-section.

Additionally, since the heat pipe condenser portion 44a is uniquely made an integral portion of the housing of the fan 42, the additional space requirement for a fin structure mounted on the heat pipe and positioned at the fan inlet is advantageously eliminated. Eliminated as well are the heat transfer inefficiency and air pressure drop problems of fins positioned at the inlet of the fan. Moreover, since the heat pipe portion 44a is wrapped around the fan inlet periphery instead of just extended linearly across the fan inlet, additional heat pipe surface area is provided from which to transfer component operating heat to the air 58.

It should also be noted that axial cooling fans conventionally used in portable computer applications are typically mounted in the computer base housing portion with their rotational axis horizontally oriented—i.e., generally parallel to the top and bottom sides of the base housing. However, as previously noted, the axial fan 42 of the present invention has its rotational axis A vertically oriented—generally perpendicular to the top and bottom sides 14,18 of the base housing 12. Because the thickness of the fan 42 parallel to its axis A is considerably smaller that the length or width of the fan perpendicular to the axis A, this advantageously permits the height of the base housing 12 to be smaller than the length or width of the fan 42 if desired.

While the illustrated fan 42 in which the heat pipe condenser portion 44a is incorporated as a shroud portion of its housing is an axial fan, the principles of the present invention are not limited to incorporating such condenser portion into an axial fan, or to using the condenser portion as a shroud. For example, two alternate centrifugal embodiments 42a,42b of the fan 42 are respectively depicted in simplified form in FIGS. 5 and 6.

Centrifugal fan 42a has the usual scrolled housing 76 with a side inlet opening 78, an impeller 80 disposed within the housing 76 and rotationally driven by a motor 82, and an outlet opening 84. During operation of the fan 42a, the rotating impeller 80 draws air 86 into the inlet opening 78, flows it through the interior of the housing 76, and then discharges the air 86 through the housing outlet opening 84.

Figures 5, 6:
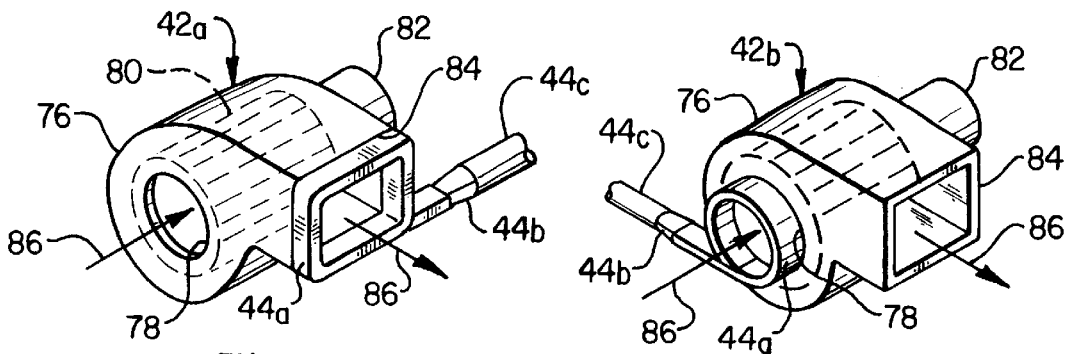
FIG. 5 is a simplified perspective view of a first alternate embodiment of the cooling fan.
FIG. 6 is a simplified perspective view of a second alternate embodiment of the cooling fan.

The illustrated condenser portion 44a of the heat pipe 44 is directly incorporated into the fan 42a as an integral portion of its housing 76 which forms an extension of its air outlet passage. Specifically, as depicted in FIG. 5, the heat pipe condenser portion 44a (as previously utilized in axial fan 42) is given an elongated rectangular cross-sectional configuration, is bent as shown to a rectangular shape, and is appropriately secured to the fan outlet 84 to form an extension thereof in a direction generally parallel to the direction of the air 86 being discharged from the centrifugal fan 42a. Preferably, the heat pipe condenser portion 44a is cross-sectionally elongated in a direction generally parallel to the direction of the air 86 being discharged from the fan 42a.

The circularly cross-sectioned evaporator portion 44c of the heat pipe 44 projects outwardly from the fan 42a to be positionable in thermal communication with a heat-generating object. Heat from such object is transferred to the heat pipe condenser portion 44a for contact by and efficient heat dissipation to the air 86 being discharged from the fan 42a.

Centrifugal fan 42b (see FIG. 6) is similar to the fan 42a with the exception that the flattened, rectangularly cross-sectioned heat pipe condenser portion 44a is bent to a circular shape (as it was in the axial fan embodiment 42) and suitably secured to the outer side of the housing 76 over the inlet opening 78 thereof. In this orientation, the heat pipe condenser portion 44a in directly incorporated in the fan housing 76 as an outer extension of its inlet air flow path, with the cross-section of the heat pipe condenser portion 44a being preferably elongated in a direction generally parallel to the air 86 entering the fan 42b. In either of the centrifugal fan embodiments 42a,42b the flattened heat pipe condenser portion 44a could alternatively be utilized to define at least an arcuate portion of the housing scroll 76.

The foregoing detailed description is to be clearly understood as being given by way of illustration and example only, the spirit and scope of the present invention being limited solely by the appended claims.

What is claimed is:

1. Heat dissipating fan apparatus comprising:

a fan housing having a flow passage therein;

a rotatable structure carried by said fan housing and being operable to force air through said flow passage; and a heat pipe having an evaporator portion positionable in thermal communication with a heat-generating object to receive heat therefrom, and a condenser portion from which the received heat may be dissipated, said condenser portion of said heat pipe defining at least part of a wall portion of said fan housing that is exposed to air being forced through a length of said flow passage extending along an axis circumscribed by said wall portion, said wall portion being wrapped around said axis and in a spaced apart relationship therewith.

2. The heat dissipating fan apparatus of claim 1 wherein:

said heat dissipating fan apparatus is an axial fan, and said fan housing has a shroud portion at least partially defined by said condenser portion of said heat pipe and coaxially circumscribing said rotatable structure.

3. The heat dissipating fan apparatus of claim 2 wherein said fan housing has a heat conductive base plate portion secured in thermal communication to said shroud portion and having air outlet openings formed therein.

4. The heat dissipating fan apparatus of claim 3 wherein said air outlet openings have air straightening tabs projecting outwardly therefrom.

5. The heat dissipating fan apparatus of claim 1 wherein:

said heat dissipating fan apparatus is a centrifugal fan, and said fan housing has an outlet passage portion at least partially defined by said condenser portion of said heat pipe.

6. The heat dissipating fan apparatus of claim 1 wherein:

said heat dissipating fan apparatus is a centrifugal fan, and said fan housing has an inlet passage portion at least partially defined by said condenser portion of said heat pipe.

7. The heat dissipating fan apparatus of claim 1 wherein:

the cross-section of said condenser portion of said heat pipe is elongated in a direction generally parallel to said axis.

8. The heat dissipating fan apparatus of claim 7 wherein:

said cross-section of said condenser portion of said heat pipe is of an elongated rectangular configuration.

9. The heat dissipating fan apparatus of claim 1 wherein said heat dissipating fan apparatus is operatively disposable within a housing portion of an electronic apparatus having a heat generating component therein with which said evaporator portion of said heat pipe may be placed in thermal communication.

10. The heat dissipating fan apparatus of claim 9 wherein said heat dissipating fan apparatus is a computer cooling fan.

11. The heat dissipating fan apparatus of claim 10 wherein said heat dissipating fan apparatus is a portable computer cooling fan.

12. The heat dissipating fan apparatus of claim 1 wherein said condenser portion of said heat pipe is longitudinally bent around said axis.

13. A method of dissipating heat from a heat-generating object, said method comprising the steps of:

providing a heat pipe having evaporator and condenser portions;

placing said evaporator portion of said heat pipe in thermal communication with the heat-generating component to receive heat therefrom;

using said condenser portion of said heat pipe to form on a cooling fan at least part of a fan housing wall portion circumscribing an axis and being exposed to air being flowed axially through a passage defined by said wall portion and extending along said axis, said using step being performed in a manner such that said condenser portion of said heat pipe forms a circumferential section of said wall portion that wraps around said axis in a spaced apart relationship therewith; and operating said fan.

14. The method of claim 13 wherein:

the fan is an axial fan having a rotatable blade portion, and said using step is performed by using said condenser portion of said heat pipe to define a fan housing shroud portion of said axial fan which coaxially circumscribes said rotatable blade portion.

15. The method claim 13 wherein:

the fan is a centrifugal fan, and said using step is performed by using said condenser portion of said heat pipe to define a fan housing outlet flow passage portion of the centrifugal fan.

16. The method of claim 13 wherein:

the fan is a centrifugal fan, and said using step is performed by using said condenser portion of said heat pipe to define a fan housing inlet flow passage portion of the centrifugal fan.

17. The method of claim 13 wherein:

the fan is a centrifugal fan having a flow-confining scroll portion, and said using step is performed by using said condenser portion of said heat pipe to define at least part of said flow-confining scroll portion.

18. The method of claim 13 further comprising the step of cross-sectionally elongating said condenser portion of said heat pipe in a direction parallel to said axis.

19. The method of claim 18 wherein said cross-sectionally elongating step is performed by providing said condenser portion of said heat pipe with an elongated, generally rectangular cross-section.

20. The method of claim 13 wherein:

the heat-generating object is a component within a computer housing, and said method further comprises the steps of placing said heat pipe and said cooling fan within said computer housing.

21. The method of claim 20 wherein:

said computer housing is a portable computer housing having vertically opposite top and bottom sides, said cooling fan is an axial fan having a rotational axis, and said step of placing said cooling fan in said computer housing is performed in a manner generally vertically orienting said rotational axis.

22. The method of claim 13 wherein said using step is performed in a manner such that said condenser portion of said heat pipe is longitudinally bent around said axis.

23. Electronic apparatus comprising:

a first housing having a heat-generating component therein;

a heat pipe disposed in said housing and having an evaporator portion and a condenser portion, said evaporator portion being in thermal communication with said component to receive heat therefrom; and a cooling fan having a fan housing with a flow passage therein, said cooling fan being operative to force air through said flow passage, said condenser portion of said heat pipe defining at least part of a wall portion of said fan housing that is exposed to air being forced through a length of said flow passage extending along an axis circumscribed by said wall portion, said wall being wrapped around said axis and in a spaced apart relationship therewith.

24. The electronic apparatus of claim 23 wherein said first housing is a base housing of a portable computer.

25. The electronic apparatus of claim 23 wherein:

said cooling fan is an axial fan having a rotatable blade structure, and said condenser portion of said heat pipe defines a fan housing shroud portion of said axial fan that coaxially circumscribes said rotatable blade structure.

26. The electronic apparatus of claim 23 wherein:

said condenser portion of said heat pipe is cross-sectionally elongated in a direction parallel to said axis.

27. The electronic apparatus of claim 26 wherein:

the cross-section of said condenser portion of said heat pipe has an elongated, generally rectangular shape.

28. The electronic apparatus of claim 23 wherein:

said first housing has vertically spaced apart top and bottom sides, said cooling fan is an axial fan having a rotational axis, and said cooling fan is disposed within said first housing with said rotational axis being generally vertically disposed relative to said first housing.

29. The electronic apparatus of claim 28 wherein:

said base housing is a portable computer base housing having a lid housing secured thereto for pivotal movement between a closed position in which said lid housing extends across and covers said top side of said base housing, and an open position in which said lid housing is pivoted upwardly away from said top side of said base housing, said top side of said base housing has a depressed edge portion forming an air inlet pocket area permitting ambient air to flow thereinto whether said lid housing is opened or closed, said base housing has an interior fan plenum area formed therein beneath said air inlet pocket area and receiving said cooling fan, said base housing has air inlet opening means formed in an exterior wall portion of said air inlet pocket area, and air outlet opening means formed in an exterior wall portion spaced apart from said air inlet opening means, and said cooling fan is operative to flow cooling air sequentially through said air inlet pocket area, said air inlet opening means, said cooling fan, and then outwardly through said air outlet opening means.

30. The electronic apparatus of claim 25 wherein said fan housing has a heat conductive base plate portion secured to said fan housing shroud portion, in thermal communication therewith, and having outlet openings formed therein.

31. The electronic apparatus of claim 30 wherein said air outlet openings have air straightening tabs projecting outwardly therefrom.

32. The electronic apparatus of claim 23 wherein said condenser portion is longitudinally bent around said axis.

* * * * *